March 3, 1959 H. E. FAVILLE ET AL 2,875,538
ADVERTISING DISPLAY
Filed Aug. 18, 1955 4 Sheets-Sheet 1

INVENTORS
HENRY E. FAVILLE
DONALD T. McKENNA
BY
Andrus & Scales
ATTORNEYS

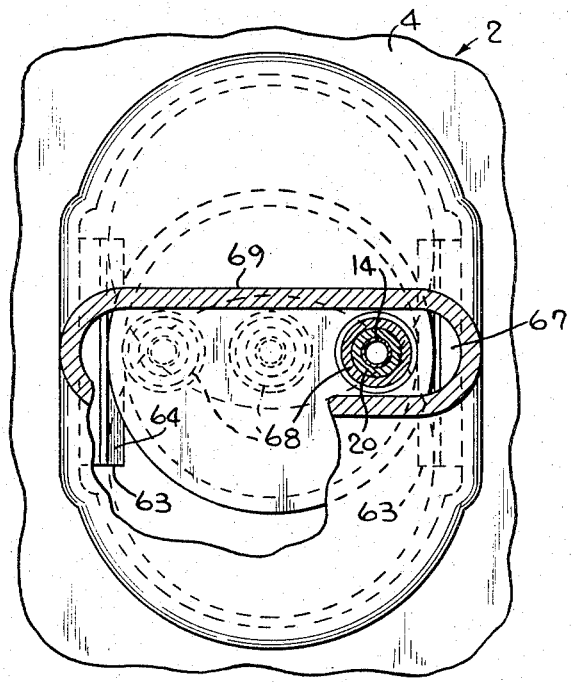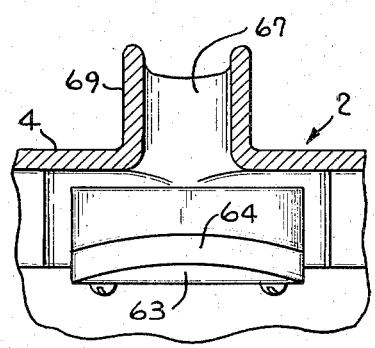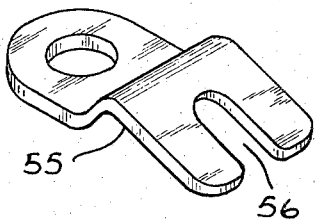

INVENTORS
HENRY E. FAVILLE
DONALD T. McKENNA
BY
ATTORNEYS

United States Patent Office 2,875,538
Patented Mar. 3, 1959

2,875,538

ADVERTISING DISPLAY

Henry E. Faville and Donald T. McKenna, Madison, Wis., assignors to Reuhl Products, Inc., Madison, Wis., a corporation of Wisconsin Application August 18, 1955, Serial No. 529,189

11 Claims. (Cl. 40—106.3)

This invention relates to an advertising display and more particularly to a display in which the displayed article is simultaneously given two distinct types of motion.

The present invention is directed to a lighted advertising display for either indoor or outdoor use. The article to be displayed, such as a representation of a bottle, container or the like, is fabricated from a translucent material, lighted from within, and is simultaneously provided with two distinct types of motion. The article is rotated about its axis and is also given a gyratory motion so that the article will gyrate within a generally circular path.

According to the invention the article to be displayed is carried by a shaft which is journaled for rotation about its axis. A drive mechanism which is driven by a motor rotates the shaft and the article about the common axis thereof. In addition to the rotation, the shaft is also mounted at its lower end for gyratory motion and rotatably supports a cam which is guided for generally circular movement. A second drive mechanism associated with the first mechanism drives the cam in the circular path and thereby moves the shaft and the attached article with a gyratory motion.

The combined movements which are imparted to the article provide an eye-catching display which is visible for great distances and is fascinating to view. The mechanism employed for producing the combined motions is simple and compact and eliminates the use of a flexible shaft for both motions are transmitted directly from the motor.

In a second embodiment of the invention the article is given an oscillatory motion in combination with rotation about its own axis by guiding the cam in straight line movement rather than circular movement.

The drawings illustrate the best mode presently contemplated of carrying out the invention.

In the drawings:

Fig. 4 is a transverse section taken along line 4—4 of Fig. 2;

Fig. 5 is a perspective view of the plate employed to prevent counter-rotation;

Fig. 7 is a transverse section taken along line 7—7 of Fig. 6; and

Fig. 8 is a vertical section taken along line 8—8 of Fig. 6.

Figure 1:
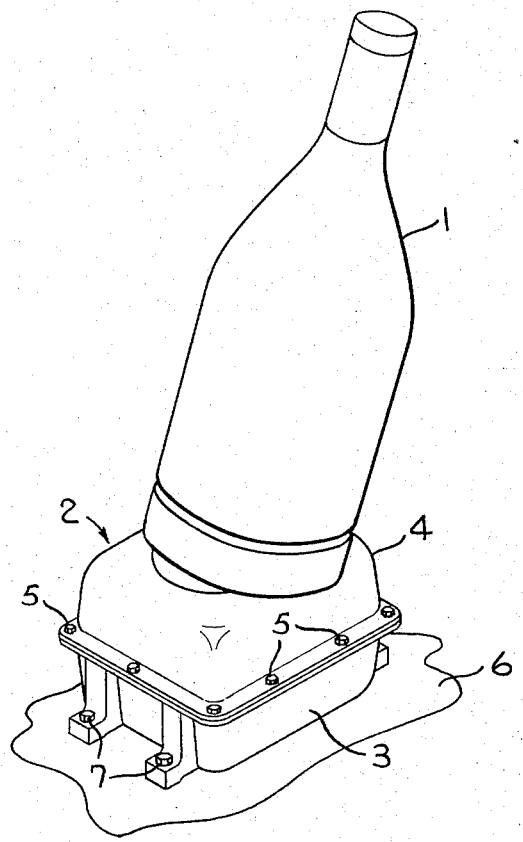
Figure 1 is a perspective view of the advertising display.
Figure 3:
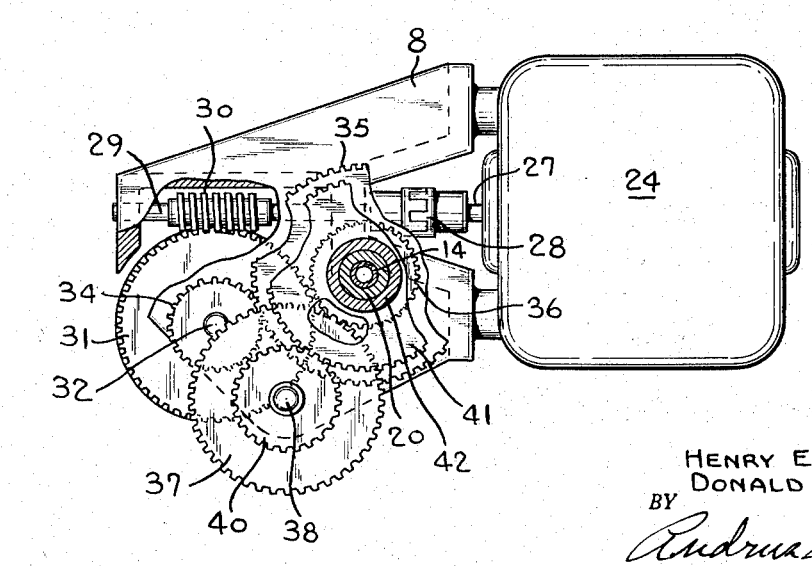
Fig. 3 is a transverse section taken along line 3—3 of Fig. 2.
Figure 2:
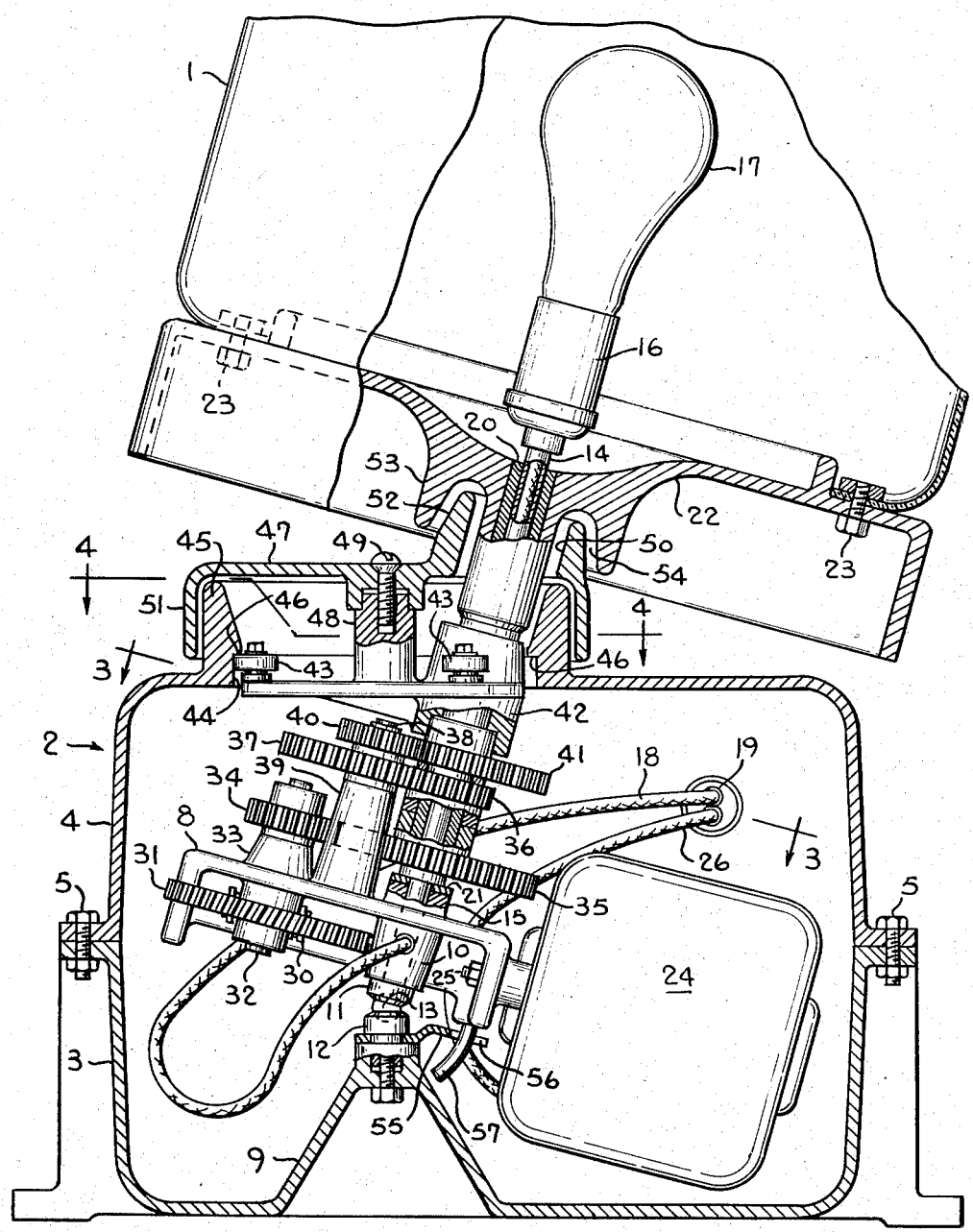
Fig. 2 is a side elevation of the apparatus with parts broken away in section.

The drawings illustrate an advertising display in which an article 1 to be displayed is supported and driven with a plurality of motions by a mechanism housed within a casing 2.

The casing 2 comprises a lower section 3 and an upper section 4 which are joined together by bolts 5. The bolts 5 are received within suitable openings in the matching flanges of the two casing sections. The lower casing 3 is adapted to rest on a foundation or support 6 and is secured thereto by bolts 7 which extend through suitable legs provided on the lower casing section 3.

The apparatus for supporting and driving the article 1 includes a frame 8 which is disposed within the casing 2 and is supported for gyratory motion on a generally conical pedestal 9 formed in lower surface of casing section 3. The frame 8 is provided with a depending hub 10 which carries a cup-shaped socket 11 while a complementary socket 12 is secured to the tip of pedestal 9. A ball 13 is received within the sockets 11 and 12 and serves as a bearing to support the frame in gyratory movement.

A shaft 14 is secured within a hub 15 formed on the upper surface of the frame. The upper end of shaft 14 extends through an opening in the upper casing section 4, and supports an electrical socket 16 into which a light-bulb 17 is threadedly engaged. The bulb 17 is disposed axially within the article 1 and serves as a source of illumination for the same.

Electrical energy is supplied to the bulb 17 by a lead wire 18 which extends from a source of electrical energy through an opening 19 in casing section 4 and passes through an opening in hub 10 to the hollow interior of shaft 14 and thence to the socket 16.

To support the article 1, a sleeve 20 is disposed around shaft 14 and the lower end of the sleeve bears against a thrust bearing 21 which is located on the upper surface of hub 15. The upper end of sleeve 20 is attached to a generally circular base 22 which is secured by bolts 23 to the bottom flange of the article 1.

The sleeve 20 and the attached article 1 are rotated about the axis of the sleeve by a drive mechanism driven by a motor 24. The motor is secured to the frame 8 by bolts 25 and electrical energy is supplied to the motor through lead 26 which extends through opening 19 to the motor.

The drive shaft 27 of the motor is connected through a coupling 28 to an extension shaft 29 which carries a worm 30. The worm 30 meshes with a worm gear 31 mounted on a shaft 32 which is journaled within a hub 33 provided on frame 8. The axis of shaft 32 extends generally parallel to the axis of shaft 14 and the upper end of shaft 32 carries a gear 34 which meshes with a gear 35 secured to the sleeve 20. With this construction, rotation of drive shaft 27 is transmitted through worm 30 and gear train 31, 34 and 35 to the sleeve 20 to rotate the same about the shaft 14. Rotation of sleeve 20 results in a corresponding rotation of base 22 and article 1 about the axis of shaft 14 and the sleeve 20.

To provide gyratory movement for the article in conjunction with the rotation, a second drive mechanism is employed which is associated with the above described mechanism. This second drive mechanism includes a gear 36 which is secured to the sleeve 20 and which meshes with a gear 37. The gear 37 is mounted on a shaft 38 which is journaled within a pedestal 39 carried by frame 8.

The shaft 38 also carries a gear 40 and this gear engages a gear 41 which is freely rotatable on sleeve 20. Gear 41 is rigidly secured to a cam 42 which is also journaled on the sleeve 20.

A plurality of rollers 43 are rotatably secured to the upper surface of cam 42 and are adapted to ride on a generally circular track 44 formed in a circular flange 45 bordering the opening in upper casing section 4. Upward displacement of the mechanism is prevented by an annular shoulder 46 formed in flange 45. The side surfaces of the rollers 43 are adapted to contact shoulder 46 and prevent the cam 42 and the attached structure from rising or being lifted upwardly.

With the present structure, rotation of sleeve 20 is transmitted through gear train 36, 37 and 41 to the cam 42. Cam 42 rotates on sleeve 20 and since the cam is restrained in its path of movement by the engagement of rollers 43 with track 44, the cam travels in a circular path causing the sleeve 20 and shaft 14 to gyrate about a vertical axis extending through ball 13, with the common axis of shaft 14 and sleeve 20 inscribing a cone with its apex at the center of ball 13.

The opening in casing section 4 is enclosed by a cover 47 which is secured centrally to a boss 48 formed in cam 42 by bolts 49. The cover 47 is provided with an opening 50 to receive sleeve 20 and shaft 14 and has a downwardly extending peripheral flange 51 which is spaced outwardly of the flange 45 and serves to prevent water, dirt, etc. from entering the casing. An upwardly extending flanged neck 52 borders the opening 50 and is spaced out of contact with the hub 53 of base 22 which surrounds sleeve 20. The neck 52 extends upwardly within an annular recess 54 formed in the hub. This registry of neck 52 and recess 54 prevents leakage of water or other elements downwardly along the sleeve 20 to the interior of the casing.

In operation of the present apparatus, rotation of the drive shaft 27 is transmitted through coupling 28 to shaft extension 29 and worm 30, thence at reduced speed through worm gear 31 to shaft 32 and gear 34. Gear 34 drives gear 35 and causes the attached sleeve 20 to rotate about shaft 14. Rotation of sleeve 20 causes base 22 and article 1 to rotate about the common axis extending through shaft 14 and sleeve 20.

Rotation of sleeve 20 is transmitted through gears 36, 37 and 41 to the cam 42. The rotation of the cam 42 drives rollers 43 on track 44 and thereby moves the cam in a generally circular path. Since the cam 42 is journaled on sleeve 20, rotation of cam 42 causes the sleeve and the attached article 1 to gyrate about a vertical axis through the ball 13. The article 1 is thus provided with two distinct motions; one motion is a rotation about the axis of the article and the second in a gyratory motion about the vertical axis through ball 13.

As the torque transmitted to cam 42 tends to produce a reactive force which would cause frame 8 and the elements attached thereto to rotate in the opposite direction, a plate 55 is secured to pedestal 9 and is provided with a slot 56 which receives a lug 57 attached to the frame. The lug 57 rides loosely within the slot and serves to restrain counter-rotation of the frame while at the same time permitting the frame and the attached elements to oscillate in a vertical plane, rock from side to side or gyrate about a vertical axis to conform to the gyratory motion of the shaft 14 and sleeve 20.

The gearing system is designed so that the cam 42 rotates at a substantially slower speed than sleeve 20. This results in the speed of rotation of the article about its axis being greater than the speed of gyration about the vertical axis through ball 13.

The advertising display of the present invention is adapted for either indoor or outdoor use. The interior of the casing is sealed off to the elements by the flange 50 and neck 52 so that the display can be employed out-of-doors without conversion or alteration of parts.

The article 1 to be displayed may be a replica of a bottle, container or any other desired object. The article is generally formed of a transparent or translucent material so the light from bulb 17 will illuminate the article from the inside and will define any desired design, lettering or other surface features incorporated on the article.

The display of the present invention provides two distinct motions to the article by means of a novel mechanism. The entire drive mechanism and supporting frame is mounted on ball 13 for gyratory motion and this construction effects simultaneous rotation of the article and gyration without the use of flexible drive shafts or the like.

Figure 6:
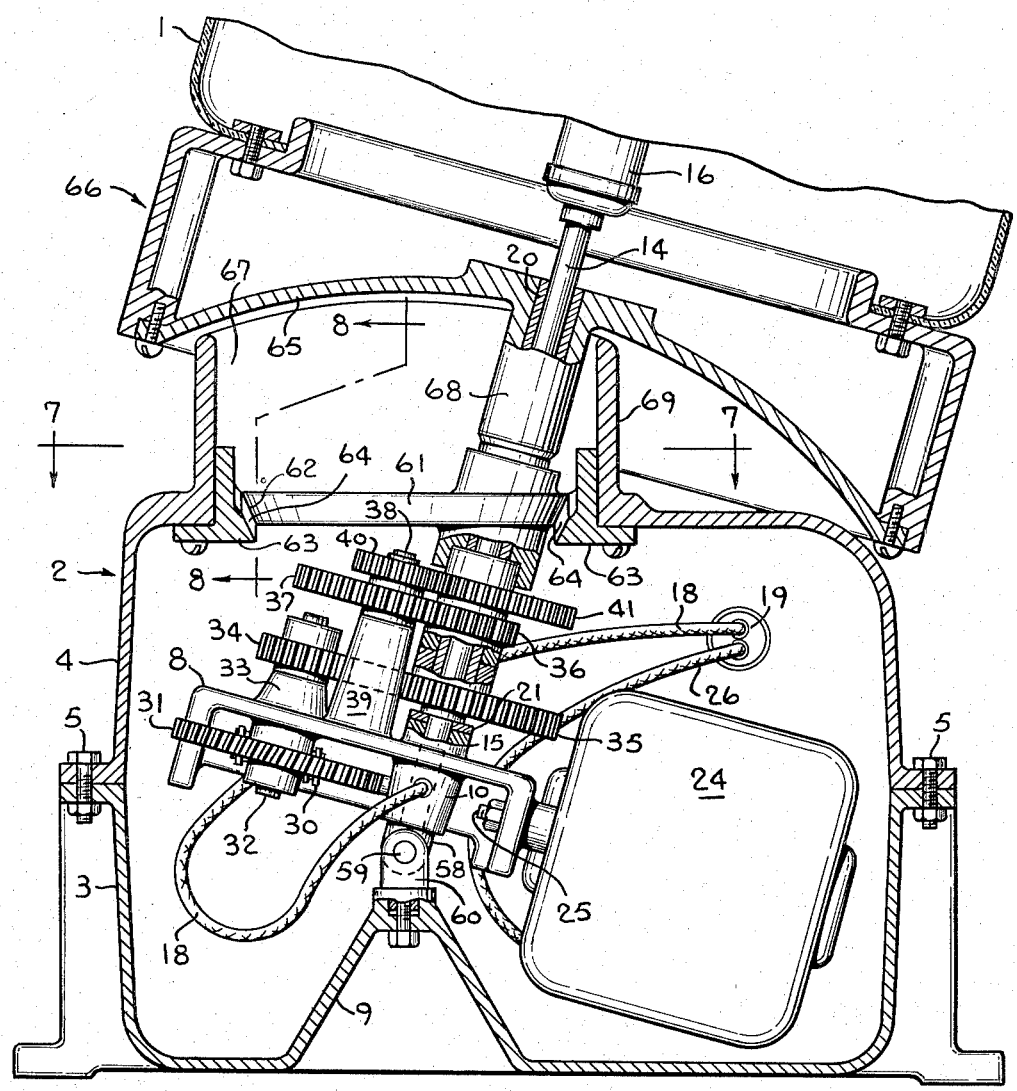
Fig. 6 is a vertical section of a modified form of the invention.

A second embodiment of the invention is shown in Figs. 6, 7 and 8. In this embodiment, the article 1, in addition to rotation about its axis, is given an oscillating motion in a vertical plane.

To provide this oscillating motion, the hub 10 carries a lug 58 which is pivotally secured by pin 59 between a pair of lugs 60 attached to pedestal 9. This connection permits the frame 8 and the attached elements to pivot about the pin 59.

A cam 61 corresponding generally to cam 42 of the first embodiment, is journaled on sleeve 20. The cam 61 is generally circular in shape and is provided with a beveled peripheral edge 62. The cam is supported at diametrically opposite positions by a pair of guide bars 63 having beveled guide surfaces 64 which are adapted to complement the edge 62 of the cam.

As the cam 61 is adapted to inscribe a generally arcuate path during oscillation of shaft 14, the surfaces of the cam are generally curved and the guide surfaces 64 of bars 63 are likewise provided with a generally arcuate contour.

The lower surface 65 of base 66, corresponding to base 22 of the first embodiment, is provided with a generally spherical concave contour so that as the base and article 1 rotate and also oscillate, the surface 65 does not contact the casing 2. In addition, the upper edge of the casing section 4 may be rounded to permit the surface 64 to move freely thereby.

The upper casing section 4 is provided with an elongated opening 67 through which the hub 68 of base 66 extends. A flange 69 or neck borders the opening 67 and projects upwardly from the section 4. Flange 69 is similar in construction and function to neck 52 of the first embodiment.

In operation, the drive mechanism, which is similar to that in the first embodiment, rotates sleeve 20 about shaft 14, and rotation of sleeve 20 causes a corresponding rotation of base 66 and the attached article about the common axis of the sleeve and the shaft. In addition, in a manner similar to that of the first embodiment, the rotation of sleeve 20 is transmitted to cam 61 which is journaled on the sleeve. The cam 61 rotates and bears against the guide surface 64 at diametrically opposite positions of the cam, thereby causing the points of contact between the cam and the guide surfaces to progressively move along the guide bars. This results in the sleeve 20 and shaft 14 being pivoted about pin 59 and thereby imparts an oscillating movement to the article as well as the rotary motion.

As shown in Fig. 6, the sleeve 20 is disposed off-center with respect to the cam 61 and as the cam rotates, the hub 68 and sleeve 20 are guided in a vertical plane within opening 67 by flange 69. The vertical plane through which sleeve 20 and hub 68 move is disposed normally to the direction of travel of cam 61.

This modified form of the invention provides two simultaneous motions for the article whereby the article rotates about its axis while at the same time oscillating within a vertical plane.

Various modes of carrying out the invention are contemplated as within the scope of the following claims particularly pointing out and distinctly claiming the subject matter which is regarded as the invention.

We claim:

1. In an advertising display, a casing, a frame disposed in the casing, bearing means associated with the casing for mounting said frame for pivotal motion, a shaft rotatably carried by the frame and having one end thereof extending through an opening in the casing, an article to be displayed axially secured to said end of the shaft, drive means supported by the frame for rotating said shaft and said article about the axis of said shaft, a cam member rotatably disposed on the shaft, means associated with the casing for guiding the cam in a separate path of movement distinct from the rotation of said shaft, and second driven means interconnecting said first drive means and the cam for driving the cam in said separate path of movement to thereby pivot said shaft and said frame about said bearing means and provide the article with an orbital motion, said movement being simultaneous with the rotation of said shaft and said article.

2. In an advertising display, a casing having an opening therein, a shaft disposed within the casing with the outer end of the shaft extending through said opening, an article to be displayed secured to the outer end of said shaft and composed of a generally translucent material, drive means disposed within said casing for rotating the shaft about the axis thereof and correspondingly rotating the article, means associated with said drive means for pivoting said shaft about the lower end thereof to impart a second and separate planetary motion to said article, said second motion occurring simultaneously with the rotation of said article, and means for illuminating the article from within the same to define the surface features of the article.

3. An advertising display, comprising a casing having a pedestal formed therein, a frame disposed within the casing, universal pivot means connected to said pedestal for supporting the frame, a tubular member secured to the frame and extending through an opening in said casing, an illuminating device secured to the outer end of the tubular member at a location external of the casing, a sleeve rotatably mounted on said tubular member and extending generally coextensively therewith, a generally translucent article to be displayed secured to the outer end portion of the sleeve and surrounding said illuminating device, a motor carried solely by said frame, means interconnecting said motor and said sleeve for rotating said sleeve about said tubular member and correspondingly rotating said article, a cam rotatably mounted on said sleeve, gear means interconnecting said sleeve and said cam to transmit the rotation of said sleeve to said cam with the speed of rotation of said sleeve being substantially greater than the speed of movement of said cam, guide means associated with said opening in the casing for guiding the cam in a generally circular path of movement with said sleeve and said article moving with said cam in a gyratory path about said universal pivot means, and a cover member to enclose said opening in said casing and prevent leakage of external elements through said opening and along said sleeve to the interior of the casing.

4. An advertising display, comprising a casing having a pedestal formed therein, a frame disposed within the casing, bearing means connected to said pedestal for supporting the frame, a tubular member secured to the frame and extending through an opening in said casing, an illuminating device secured to the outer end of the tubular member at a location external of the casing, a sleeve rotatably mounted on said tubular member and extending generally coextensively therewith, a generally translucent article to be displayed secured to the outer end portion of the sleeve and surrounding said illuminating device, a motor carried solely by said frame, means interconnecting said motor and said sleeve for rotating said sleeve about said tubular member and correspondingly rotating said article, a cam freely mounted on said sleeve, gear means interconnecting said sleeve and said cam to transmit the rotation of said sleeve to said cam with the speed of rotation of said sleeve being substantially greater than the speed of movement of said cam, guide means associated with said opening in the casing for guiding the cam in a path of movement separate from the rotation of said sleeve and thereby pivoting with said sleeve and said article about said bearing means, and means for resisting counter rotation of the frame.

5. An advertising display, comprising a casing, a frame disposed within the casing, universal pivot means associated with the casing for supporting the frame, shaft means rotatably secured to the frame in axial alignment with said universal pivot means and extending outwardly of the casing through an opening therein, an article to be displayed secured to the outer end portion of said shaft means at a location external of the casing, drive means supported by the frame for rotating said shaft means about the axis thereof and correspondingly rotating said article, cam means mounted for rotation on said shaft means, transmission means for transmitting the rotation of said shaft means to said cam means, means associated with said transmission means for imparting a substantially slower speed of movement to said cam means than said shaft means, and means for guiding said cam means in a generally circular path of movement with said shaft means and said article moving with said cam means in a gyratory path about said universal pivot means.

6. An advertising display, comprising a casing, a frame disposed within the casing, a support member associated with the casing for supporting said frame in gyratory movement, shaft means rotatably secured to the frame and extending outwardly of the casing through an opening therein, an article to be displayed secured to the outer end portion of said shaft means at a location external of the casing, drive means supported by the frame for rotating said shaft means about the axis thereof and correspondingly rotating said article, cam means mounted for rotation on said shaft means, transmission means for transmitting the rotation of said shaft means to said cam means, and means for guiding said cam means in a generally circular path of movement with said shaft means and said article moving with said cam means in a gyratory path about said universal pivot means.

7. Any advertising display, comprising a supporting member, pivotal means for mounting the supporting member for gyratory movement, an article to be displayed secured to the supporting member, drive means for gyrating said supporting member and the article about the pivotal means, and second drive means associated with said first drive means for rotating said supporting member about the axis thereof at a speed substantially greater than the speed of gyration of said support member to thereby impart two separate and simultaneous motions to the article.

8. An outdoor advertising display, comprising a casing, shaft means disposed within the casing with the upper end of the shaft means extending through an opening in the casing to the exterior thereof, bearing means associated with the casing for supporting the shaft means in gyratory movement about said bearing means, an article to be displayed secured to the outer end portion of said shaft means at a location external of the casing, drive means for rotating the shaft means about the axis thereof and correspondingly rotating said article, a cam member mounted for rotation about the center thereof and having an opening therein spaced from said center with said shaft means being journaled within said opening, second drive means for rotating said cam member about the center thereof to thereby move the shaft means in a gyratory path simultaneously with the rotation of said shaft means, and a cover member to enclose the open end of the casing and including a sealing member associated with the shaft for preventing leakage of water and other elements into said casing.

9. An advertising display, comprising a casing, a shaft disposed within the casing with the upper end of the shaft extending through a slot in the casing to the exterior thereof, bearing means associated with the casing for supporting the shaft in pivotal movement in a generally vertical plane, an article to be displayed secured to the outer end portion of said shaft means at a location external of the casing, drive means for rotating the shaft about the axis thereof and correspondingly rotating said article, a generally circular cam member mounted for reciprocating movement within the casing and having an opening therein spaced from the center thereof to freely receive said shaft, and second drive means for rotating the cam member about the center thereof to thereby pivot said shaft within said slot and correspondingly move the cam member in reciprocating movement.

10. An advertising display, comprising a casing, a frame disposed within the casing, a shaft rotatably mounted on the frame with the upper end of the shaft extending through a slot in the casing to the exterior thereof, bearing means associated with the casing for supporting the frame and shaft in pivotal movement in a generally vertical plane, an article to be displayed secured to the outer end portion of said shaft means at a location external of the casing, a gear mechanism carried by the frame for rotating the shaft about the axis thereof and correspondingly rotating said article, a generally circular cam member having an opening therein spaced from the center thereof to freely receive said shaft, guide means associated with said casing for guiding said cam member in a reciprocating path of movement disposed in a plane generally normal to the longitudinal dimension of said slot, and a second gear mechanism associated with said first gear mechanism for rotating said cam member about the central axis thereof to thereby pivot said shaft within said slot and move the cam member in said reciprocating path, the pivotal movement of said shaft imparting a separate and simultaneous oscillating motion to the article together with rotation thereof.

11. In an advertising display, a frame, bearing means for mounting the frame for pivotal motion, a shaft rotatably carried by the frame, an article to be displayed secured to the shaft, and drive means including a motor supported solely by the frame for rotating the shaft and the article about the axis of said shaft and for simultaneously gyrating the frame about said bearing means to also provide the article with an orbital motion.

References Cited in the file of this patent

UNITED STATES PATENTS

| 870,525 | Bonnert | Nov. 5, 1907 |
| 1,410,336 | Ludwig | Mar. 21, 1922 |
| 1,650,280 | Koenig | Nov. 22, 1927 |
| 1,751,548 | Harber | Mar. 25, 1930 |
| 2,487,591 | Ricci | Nov. 8, 1949 |

FOREIGN PATENTS

| 358,240 | Italy | Apr. 9, 1938 |
| 943,795 | France | Oct. 11, 1948 |